ary of documents

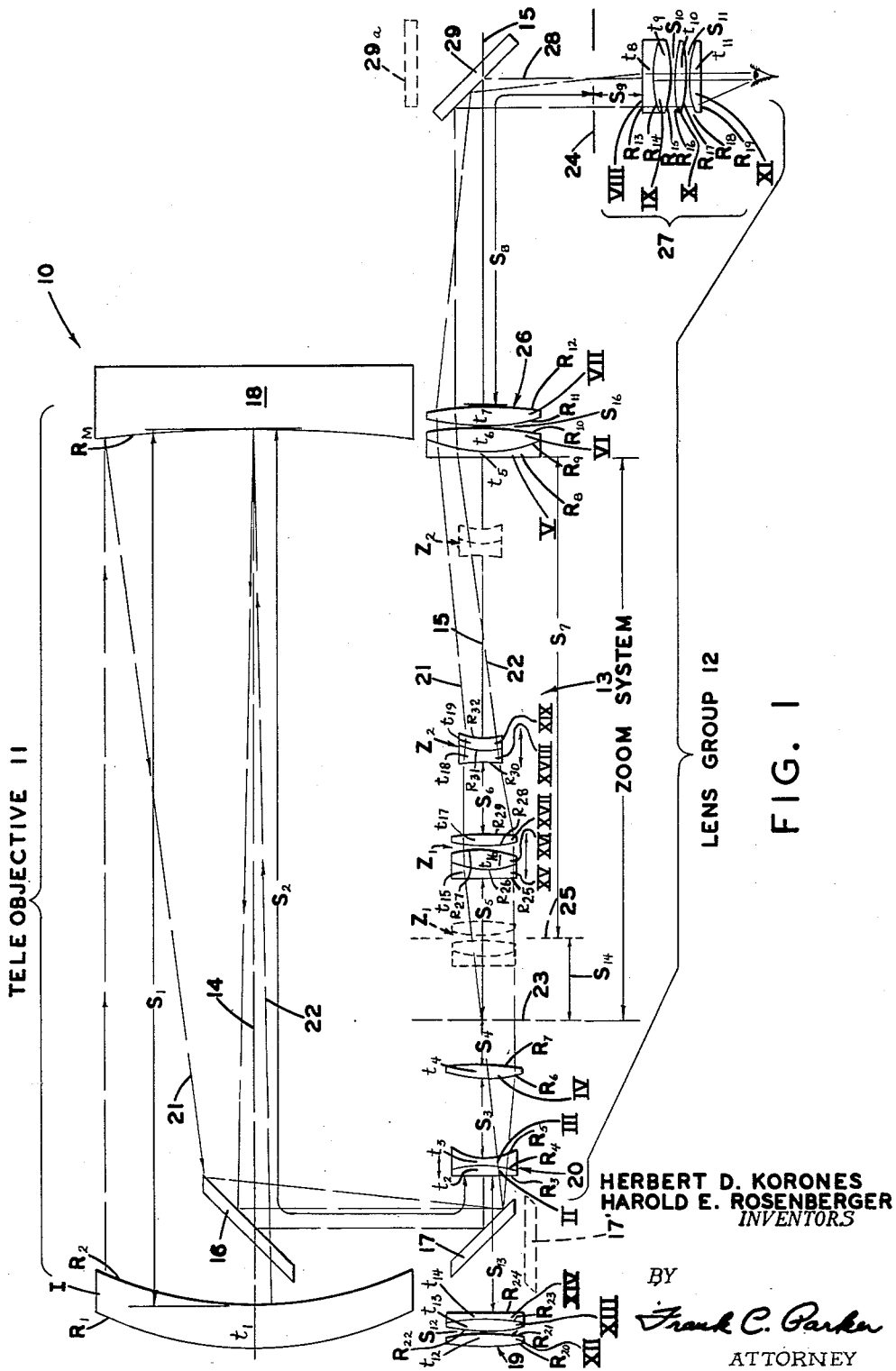

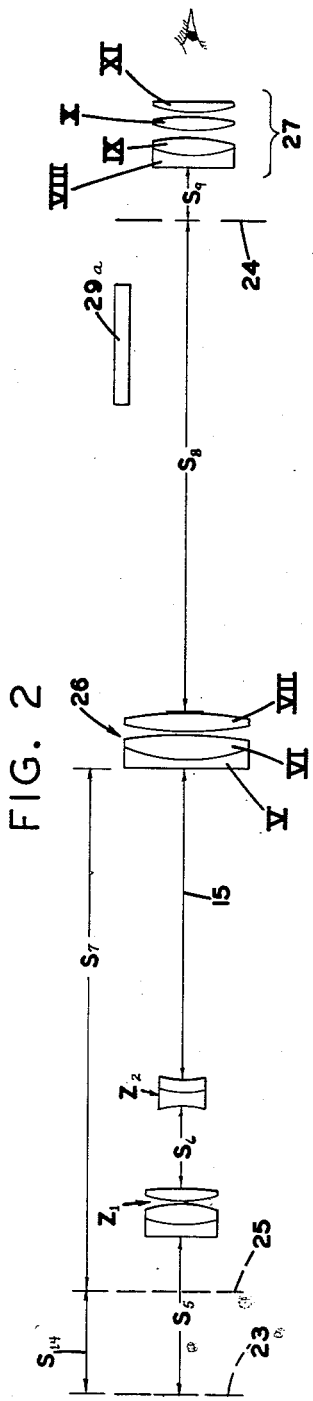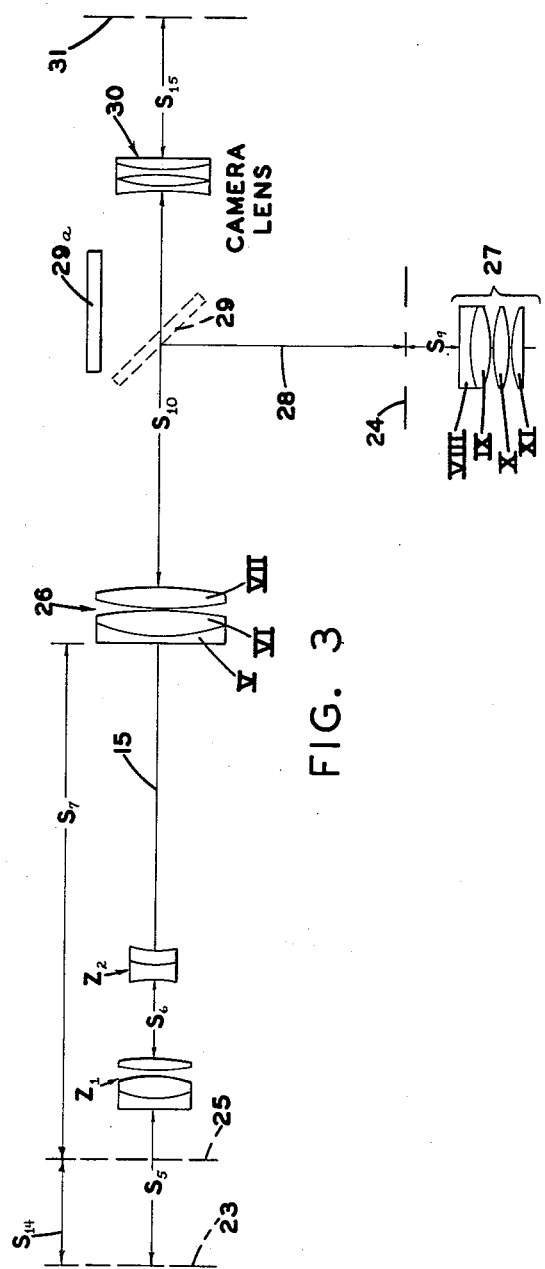

United States Patent Office 3,152,214
Patented Oct. 6, 1964

3,152,214
OPTICAL SYSTEM FOR ZOOM TYPE TELESCOPE HAVING MIRROR AND FINDER OBJECTIVES
Herbert D. Korones, Rochester, and Harold E. Rosenberger, Brighton, N.Y., assignors to Bausch & Lomb Incorporated, Rochester, N.Y., a corporation of New York
Filed Feb. 19, 1962, Ser. No. 174,025
4 Claims. (Cl. 88—57)

This invention relates generally to telescopes and more particularly it relates to compound telescopes having means for varying the magnification of the image formed thereby.

Although compound telescopes of diverse kinds are to be found in the prior art, efforts to provide variable magnification in a catadioptric type of compound telescope have usually been limited to the alternate use of eyepieces having different magnification ratings. The disadvantages of such a device come from the fact that the magnification of the optical system is varied in steps over the total range of magnification and all magnifications between said steps are unavailable.

Not all zoom optical systems may be designed into a telescope to provide constant and continuous variation in the magnification of the image since the resulting optical system may have poor imagery at some part in the range of magnification and in some part of the range the eyepoint may be too short for comfortable observation.

In view of the aforesaid difficulties, it is an object of this invention to provide a novel optical system for a compound telescope which has superior optical performance, a large zoom range, and a substantially constant and long eye distance. Advantages of a zoom optical system, particularly in astronomical observation include simplification of tracking and finding objects by virtue of the continuously variable zoom feature.

Another object is to provide a zoom type of compound telescope wherein the image quality in all parts of the operating range is of excellent optical grade.

A further object is to provide such a device in which a part of said optical system is used alternatively as a finder telescope while maintaining the variable magnification feature therein, the image being well corrected and substantially stationary at the focus of the eyepiece for all conditions of magnification regardless of whether the image is produced by the entire telescope optical system or by the finder telescope per se.

A further object is to provide such a device in which the eyepoint is substantially stationary for all conditions of magnification regardless of whether the image is produced by the entire telescope optical system or by the finder telescope.

A still further object of this invention is to provide such a device which is adaptable, partly by reason of the favorable zoom lens means, to a large number of visual and photographic uses in an expeditious and reliable manner.

Further objects and advantages of this invention will be apparent in the combinations and arrangements of the constituent parts as well as in the constructional details thereof by reference to the specification herebelow taken in connection with the accompanying drawings in which, FIG. 1 is a diagrammatic view of a telescope embodying a preferred form of the present invention, FIG. 2 is a diagrammatic view of the eyepiece end of said telescope showing an alternate operative condition thereof, and FIG. 3 is a view similar to FIG. 2 of another operative condition of said telescope embodying means for photographing the image formed thereby.

According to the present invention, a preferred form is shown in FIG. 1 of the drawing which represents a compound catadioptric telescope 10 which is useful for astronomical as well as other telescopic observations.

For normal use said catadioptric telescope 10 comprises the combination of a first optical group 11 constructed in the form of a catadioptric teleobjective, and a second optical group 12 which includes means 13 for varying the magnification of the image transmitted thereby, said first and second optical groups being in part arranged on parallel axes 14 and 15 respectively. Said optical groups 11 and 12 are optically and operatively connected together by a pair of inclined flat mirrors 16 and 17 positioned in optical alignment with and between the optical groups 11 and 12 and in alignment with each other so that the image rays travel successively through the two groups in the order named.

Typical image rays 21 and 22 illustrated in FIG. 1 are transmitted by the optical member I and reflected from the concave mirror 18. They are then reflected by way of the plane mirrors 16 and 17 and are transmitted by the members of lens group 12. These image rays pass in succession through a focusing lens 20 and a collective lens IV which cooperatively produce an image 23 at the focus of the zoom system 13. As the name of lens 20 indicates, it is movably mounted for axial motion by suitable focusing mechanism so as to produce the desired axial adjustment which is required for maintaining a constant image at plane 23 regardless of whether the object under observation is located at infinity or at some closer distance. The aforementioned focusing lens 20 and collective lens IV are chosen so that in addition to producing the image at the image plane 23 they cooperatively image the entrance pupil of the telescope into said zoom lens system 13 in the most favorable manner for maintaining a substantially constant eye distance. Said entrance pupil is imaged by the zoom system 13 to form a subsequent pupil which remains substantially stationary throughout the range of magnification thereby assuring a constant position of the eyepoint of the telescope as well as substantially constant aberration correction in the lenses positioned rearwardly thereof.

The aforementioned teleobjective 11 comprises a meniscus corrector lens I and a concave mirror 18 which are spaced apart from each other at a fixed distance $S_1$ on their common axis 14, and having their concave sides facing each other. The constructional data for said lens and mirror are so chosen that the lens I corrects the spherical aberration of the mirror 18 without introducing chromatic or other deleterious aberrations.

Particularly the teleobjective 11 is so designed and constructed as to provide excellent imagery, especially with regard to freedom from coma over a wide field of view as compared to a parabolic type of reflector. To obtain this and other beneficial effects the meniscus corrector lens I should have a focal length $F_1$ which is numerically about 50 times the focal length $F_2$ of the concave mirror 18. Furthermore, the ranges of values for the focal lengths $F_1$ and $F_2$ and the space $S_1$ therebetween should be as specified in the mathematical statements herebelow wherein F represents the focal length of the teleobjective 11 per se.

$$43.0F < -F_1 < 53.0F$$
$$.87F < F_2 < 1.07F$$
$$.68F < S_1 < .84F$$

In one condition of use, the second optical group 12 acts together with an alternate finder objective 19 which is located coaxially forwardly thereof, the combination forming a finder telescope with a greatly increased field of view and a lower range of magnification than is obtained in normal use using the teleobjective 11. To convert the telescope to such alternate use, the mirror 17 is pivotally mounted to swing to the dotted line position 17' out of optical alignment with the first optical group 11, and out of the path of light traversing the finder objective 19 so that said finder objective becomes operationally united with the lens group 12 to form a finder telescope.

On the axis 15, the parts of the aforesaid finder telescope are arranged comprising a telescope objective 19, a focusing lens 20 spaced on axial distance $S_{13}$ rearwardly thereof and followed by a collective field lens IV which is spaced at a distance $S_3$ rearwardly of lens 20.

The optical design of the finder or alternate objective 19 should be compatible with the optical design of the teleobjective 11 and the construction thereof should introduce the typical image rays 21 and 22 into the zoom lens system 13 in the same manner as the teleobjective as above described. Additionally the alternate objective 19 should be located in a position of parfocality with the teleobjective 11 for some particular object distance so that refocusing of the telescope is not necessary when changing from one objective to the other, and additionally should be collimated to the teleobjective 11 so that aiming errors are not introduced when changing from one objective to the other.

The aforesaid zoom lens system 13 may be of any form which is so designed as to relay the image formed at the plane 23 rearwardly through the succeeding lens members to form another image at a zooming image plane 25 so that it may be observed directly or relayed by succeeding lenses into a favorable location for observation. It is preferred to use a zoom lens system 13 as illustrated in the drawing, said system being previously disclosed and described in detail in our copending U.S. patent application which is identified by Serial Number 113,474 filed May 29, 1961.

Said zoom system 13 comprises a front positive lens $Z_1$ and a rear negative lens $Z_2$ which are movable simultaneously and continuously in such a manner as to form a virtual image at image plane 25 of the image formed as aforesaid by the focusing lens 20 and collective lens IV which becomes the object with respect to said zoom system 13. Said virtual image remains substantially stationary at plane 25 during all changes of its size or magnification due primarily to the favorable choice of focal lengths and spacings of the zoom lenses $Z_1$ and $Z_2$ during their entire excursions. The positions of lenses $Z_1$ and $Z_2$ shown in full lines represent one end of said excursion while the dotted lines show the positions of said lenses at the other end of the excursion, the axial distance between plane 23 and lens $Z_1$ being represented by $S_5$, the axial distance between lenses $Z_1$ and $Z_2$ being $S_6$, the axial distance between image plane 25 and the next rearward lens being designated by $S_7$, and the axial distance between the image planes 23 and 25 being designated as $S_{14}$. In the preferred embodiment of said zoom system 13 as described in the copending application Serial No. 113,474, zoom lens $Z_1$ is composed of a positive front doublet lens having a foremost negative lens element XV which lies in contact with a rear double convex lens element XVI, and is further composed of a closely spaced singlet double convex lens XVII. Said rear zoom lens $Z_2$ is composed of a front double concave lens element XVIII which lies in contact with a rear positive meniscus lens element XIX. The details of construction of the zoom system 13 are given hereinafter.

Next rearwardly of said zoom system 13 a positive erector lens 26 is provided comprising a negative element V and two positive elements VI and VII, the first two elements being united to form a compound lens. Image rays passing through erector lens 26 are focused at image plane 24 at an axial distance of $S_8$ rearwardly thereof.

An eyepiece 27 focused at image plane 24 is positioned at an axial distance $S_9$ rearwardly of image plane 24, said eyepiece comprising a front negative lens element VIII, a positive element IX, and two succeeding positive singlet lenses X and XI.

As mentioned heretofore in the specification, the telescope 10 is so constructed as to serve a plurality of visual and photographic uses because of the advantageous construction and arrangement of the parts of the telescope.

As shown in FIG. 1 of the drawing, the eyepiece axis 28 is directed normal to the telescope axis 15 by an angularly disposed plane mirror 29 to provide a comfortable position for the observer and said mirror may be swung to the position 29a for straight-through viewing, if desired, as shown in FIG. 2 of the drawing. The two positions of the eyepiece 27 are parfocal so that no additional focusing of the eyepiece is necessary. The construction of the eyepiece 27 is such that it is highly corrected, especially for distortion.

For photographic uses, the mirror 29 may if desired be swung to the position 29a shown in FIG. 3 so that the image rays pass undeflected along axis 15 and an auxiliary or camera lens 30 may be provided to bring said rays to a focus on a film plane 31 located at a convenient distance $S_{15}$ behind said auxiliary lens. The auxiliary lens 30 may be constructed in any desired form which will, as here shown, form an image at the required distance $S_{15}$ rearwardly therefrom and at the required magnification. Alternatively, the photographic device and camera lens 30 may be located on a lateral axis 28 by moving the mirror 29a to the dotted line position 29 shown in FIG. 3.

It has been found that the best range of values for the focal lengths $F_1$ to $F_9$ of the successive optical members I, 18, 20, IV, $Z_1$, $Z_2$, 26, 27 and 19; and the range of values for the axial air spaces $S_1$ to $S_{14}$ and $S_{16}$ surrounding said optical members is given in the table of numerical expressions herebelow wherein F represents the combined focal length of the corrector lens I and concave mirror 18, $$43.0F < -F_1 < 53.0F$$
$$.87F < F_2 < 1.07F$$
$$.18F < -F_3 < .24F$$
$$.21F < F_4 < .29F$$
$$.088F < F_5 < .108F$$
$$.081F < -F_6 < .098F$$
$$.18F < F_7 < .24F$$
$$.046F < F_8 < .056F$$
$$.14F < F_9 < .26F$$
$$.68F < S_1 < .84F$$
$$\left.\begin{array}{c}.80F < S_2 < .99F \\ .072F < S_3 < .088F\end{array}\right\} \text{when focused for infinity}$$
$$.036F < S_4 < .044F$$
$$S_5 = \begin{cases}.138F \text{ low } m \\ .102F \text{ high } m\end{cases}$$
$$S_6 = \begin{cases}.041F \text{ low } m \\ .350F \text{ high } m\end{cases}$$
$$.40F < S_7 < .50F$$
$$.33F < S_8 < .41F$$
$$.033F < S_9 < .041F$$
$$.00059F < S_{10} < .00072F$$
$$.00059F < S_{11} < .00072F$$
$$.00059F < S_{12} < .00072F$$
$$.088F < S_{13} < .108F$$
$$.0598F < S_{14} < .0730F$$
$$.000783F < S_{16} < .000957F$$

wherein $m$ represents magnification

Furthermore, the range of values of the radii of the optical surfaces $R_1$ to $R_{32}$ and $R_m$, the axial thickness $t_1$ to $t_{19}$ of the lens elements I to XIX, and the refractive index $n_D$ and Abbe number $\nu$ thereof is given in the table of mathematical expression herebelow:

$$\begin{aligned}
&.33F < +R_1 < .41F \\
&.32F < +R_2 < .40F \\
&1.02 < \tfrac{R_1}{R_2} < 1.05 \\
&.021F < t_1 < .027F \\
&1.500 < n_D < 1.530 \\
&60.0 < \nu < 69.0 \\
&.68F < S_1 < .84F
\end{aligned} \right\} \text{Corrector Lens I}$$

$$1.7F < -R_m < 2.2F \text{ (mirror 18)}$$
$$.80F < S_2 < .99F \text{ (when focused for infinity)}$$

$$\left. \begin{aligned}
&.30F < +R_3 < .38F \\
&.10F < -R_4 < .13F \\
&.06F < +R_5 < .08F \\
&.0068F < t_2 < .0084F \\
&.0029F < t_3 < .0036F \\
&1.615 < n_D(\text{II}) < 1.630 \\
&32.0 < \nu(\text{II}) < 40.4 \\
&1.515 < n_D(\text{III}) < 1.530 \\
&55.0 < \nu(\text{III}) < 64.0
\end{aligned} \right\} \text{Focusing Lens 20}$$

$$.072F < S_3 < .088F \text{ (when focused for infinity)}$$

$$\left. \begin{aligned}
&.148F < +R_6 < .182F \\
&.53F < -R_7 < .67F \\
&.0052F < t_4 < .0064F \\
&1.500F < n_D < 1.530 \\
&60.0 < \nu < 69.0
\end{aligned} \right\} \text{Collective Lens IV}$$

$$.036F < S_4 < .044F \text{ (lens to image plane 23)}$$

$$S_5 = \begin{cases} .138F \text{ low } m \\ .102F \text{ high } m \end{cases}$$

Zoom Lens $Z_1$
$$\left. \begin{aligned}
&.088F < F_5 < .108F \\
&.372F < -R_{25} < .397F \\
&.0714F < R_{26} < .0890F \\
&.0714F < -R_{27} < .0890F \\
&.0979F < R_{28} < .1253F \\
&.1270F < -R_{29} < .1536F \\
&.00489F < t_{15} < .00596F \\
&.01514F < t_{16} < .01860F \\
&.00871F < t_{17} < .01077F
\end{aligned} \right\} \text{Zoom system 13}$$

$$S_6 = \begin{cases} .041F \text{ low } m \\ .350F \text{ high } m \end{cases}$$

Zoom Lens $Z_2$
$$\left. \begin{aligned}
&.081F < -F_6 < .098F \\
&.0979F < -R_{30} < .1172F \\
&.0315F < R_{31} < .0382F \\
&.0558F < R_{32} < .0655F \\
&.0050F < t_{18} < .00656F \\
&.00636F < t_{19} < .00764F \\
&.40F < S_7 < .50F
\end{aligned} \right.$$

wherein $m$ represents magnification and the minus $(-)$ sign used with the R values applies to those lens surfaces whose centers of curvature are located on the entrant sides of their vertices, $$\left. \begin{aligned}
&1.28F < -R_8 < 1.56F \\
&.17F < +R_9 < .21F \\
&.16F < -R_{10} < .19F \\
&.0058F < t_5 < .0072F \\
&.0130F < t_6 < .0158F \\
&1.700 < n_D(\text{V}) < 1.740 \\
&26.0 < \nu(\text{V}) < 33.0 \\
&1.500 < n_D(\text{VI}) < 1.530 \\
&60.0 < \nu(\text{VI}) < 69.0 \\
&.00078F < S_{15} < .00096F \\
&.20F < +R_{11} < .26F \\
&.39F < -R_{12} < .48F \\
&.010F < t_7 < .013F \\
&1.500 < n_D(\text{VII}) < 1.530 \\
&60.0 < \nu(\text{VII}) < 69.0
\end{aligned} \right\} \text{Erector Lens 26}$$

$$.33F < S_8 < .41F \text{ (Erector 26 to plane 24)}$$
$$.033F < S_9 < .041F$$

$$\left. \begin{aligned}
&R_{13} > F \\
&.039F < R_{+14} < .047F \\
&.098F < -R_{15} < .122F \\
&.0029F < t_8 < .0036F \\
&.014F < t_9 < .017F \\
&1.720 < n_D(\text{VIII}) < 1.740 \\
&26.0 < \nu(\text{VIII}) < 33.0 \\
&1.600 < n_D(\text{IX}) < 1.620 \\
&53.0 < \nu(\text{IX}) < 61.0 \\
&.00059F < S_{10} < .00072F \\
&.069F < +R_{16} < .086F \\
&.32F < -R_{17} < .40F \\
&.0072F < t_{10} < .0088F \\
&1.575 < n_D(\text{X}) < 1.600 \\
&50.0 < \nu(\text{X}) < 57.0 \\
&.00059F < S_{11} < .00072F \\
&.042F < R_{18} < .052F \\
&.087F < R_{19} < .105F \\
&.0067F < t_{11} < .0081F \\
&1.600 < n_D(\text{XI}) < 1.620 \\
&53.0 > \nu(\text{XI}) < 61.0
\end{aligned} \right\} \text{Eyepiece 27}$$

$$\left. \begin{aligned}
&.14F < R_{20} < .19F \\
&.90F < -R_{21} < 1.10F \\
&.18F < +R_{22} < .23F \\
&.17F < -R_{23} < .21F \\
&R_{24} > F \\
&.0054F < t_{12} < .0068F \\
&.0070F < t_{13} < .0086F \\
&.0039F < t_{14} < .0048F \\
&.00059F < S_{12} < .00072F \\
&.088F < S_{13} < .108F \\
&1.500 < n_D(\text{XII}) < 1.530 \\
&60.0 < \nu(\text{XII}) < 69.0 \\
&1.500 < n_D(\text{XIII}) < 1.530 \\
&60.0 < \nu(\text{XIII}) < 69.0 \\
&1.740 < n_D(\text{XIV}) < 1.760 \\
&24.0 < \nu(\text{XIV}) < 32.0
\end{aligned} \right\} \begin{aligned}\text{Finder telescope}\\\text{objective 19}\end{aligned}$$

In one successful form of this invention the constructional data for telescope 10 is given more specifically in the following table of numerical relationships wherein the symbols have the same meaning as heretofore.

$$\begin{aligned}
R_1 &= .371F & R_{13} &= \infty \\
R_2 &= .358F & R_{14} &= .043F \\
-R_m &= 1.95F & -R_{15} &= .110F \\
R_3 &= .345F & R_{16} &= .0775F \\
-R_4 &= .116F & -R_{17} &= .364F \\
R_5 &= .071F & R_{18} &= .047F \\
R_6 &= .165F & R_{19} &= .0967F \\
-R_7 &= .599F & R_{20} &= .165F \\
-R_8 &= 1.424F & -R_{21} &= 1.00F \\
R_9 &= .191F & R_{22} &= .202F \\
-R_{10} &= .178F & -R_{23} &= .191F \\
R_{11} &= .230F & R_{24} &= \infty \\
-R_{12} &= .438F &
\end{aligned}$$

$$\left. \begin{aligned}
-R_{25} &= 177.01 \\
R_{26} &= 37.67 \\
-R_{27} &= 37.67 \\
R_{28} &= 53.45 \\
-R_{29} &= 65.46 \\
-R_{30} &= 50.58 \\
R_{31} &= 16.14 \\
R_{32} &= 27.04
\end{aligned} \right\} \text{Absolute values in millimeters}$$

$$\begin{aligned}
t_1 &= .0243F & t_8 &= .00327F \\
t_2 &= .0076F & t_9 &= .01566F \\
t_3 &= .00326F & t_{10} &= .00805F \\
t_4 &= .00587F & t_{11} &= .0074F \\
t_5 &= .00653F & t_{12} &= .00609F \\
t_6 &= .01436F & t_{13} &= .00783F \\
t_7 &= .01175F & t_{14} &= .00435F
\end{aligned}$$

$$\left. \begin{aligned}
t_{15} &= 2.5 \\
t_{16} &= 7.8 \\
t_{17} &= 4.5 \\
t_{18} &= 2.6 \\
t_{19} &= 3.2
\end{aligned} \right\} \text{Absolute values in millimeters}$$

$$\begin{aligned}
S_1 &= .76F \\
S_2 &= .90F \\
S_3 &= .080F
\end{aligned} \bigg\} \text{when focused for infinity}$$

$$\begin{aligned}
S_4 &= .0396F \\
S_5 &= \begin{cases} .138F \text{ low } m \\ .102F \text{ high } m \end{cases} \\
S_6 &= \begin{cases} .041F \text{ low } m \\ .350F \text{ high } m \end{cases} \\
S_7 &= .446F \\
S_8 &= .37F \\
S_9 &= .037F \\
S_{10} &= .000653F \\
S_{11} &= .000653F \\
S_{12} &= .000653F \\
S_{13} &= .0979F \\
S_{14} &= .0664F \\
S_{15} &= .00087F
\end{aligned}$$

wherein $m$ represents magnification.

The specification of values for $n$ and $\nu$ in the aforesaid successful form of the invention is given in the table of mathematical statements herebelow, wherein: I to XIV designate the successive optical members in the optical system 10, $$n_D(\text{I}) = n_D(\text{IV}) = n_D(\text{VI}) = n_D(\text{VII}) = n_D(\text{XII}) = n_D(\text{XIII})$$
$$\nu(\text{I}) = \nu(\text{IV}) = \nu(\text{VI}) = \nu(\text{VII}) = \nu(\text{XII}) = \nu(\text{XIII})$$
$$n_D(\text{II}) - n_D(\text{III}) > .090$$
$$\nu(\text{III}) - \nu(\text{II}) > 23.0$$
$$n_D(\text{V}) - n_D(\text{VI}) > .200$$
$$\nu(\text{VI}) - \nu(\text{V}) > 32.0$$
$$n_D(\text{VIII}) - n_D(\text{IX}) > .100$$
$$\nu(\text{IX}) - \nu(\text{VIII}) > 25.0$$
$$n_D(\text{XIV}) - n_D(\text{XIII}) > .220$$
$$\nu(\text{XIII}) > \nu(\text{XIV}) > 33.0$$
$$n_D(\text{IX}) - n_D(\text{X}) > .020$$
$$\nu(\text{IX}) - \nu(\text{X}) > 3.0$$
$$n_D(\text{IX}) = n_D(\text{XI})$$
$$\nu(\text{IX}) = \nu(\text{XI})$$

It will be observed from the foregoing that there is here disclosed a catadioptric type of compound telescope having excellent optical performance and which comprises a zoom optical system of superb quality which is fully operatively found in either the complete telescope 10 or the finder telescope per se by simple and reliable means without impairing said quality in either condition of use.

Although only one preferred form of this invention has been described with particularity, other forms are possible and changes may be made in the arrangement of parts and details of construction without departing from the spirit of the invention as defined in the appended claims.

We claim:

1. An optical system for a pancratic telescope formed of a teleobjective group and a finder group of optical parts together with mirror means which are optically operably aligned to connect said groups, a part of the mirror means being movable to disconnect said groups, the optical members of the first group being a meniscus corrector lens designated I which is optically aligned with and is concave toward a spherically concave mirror which is spaced at an axial distance designated $S_1$ from lens I, said finder group comprising a plurality of optically aligned members, said members being an alternative objective member, which is composed of a front singlet and a rear doublet lens which are spaced apart by a distance designated $S_{12}$, said singlet being designated XII and said doublet having a front positive lens element XIII and a rear negative lens element XIV in contact therewith, an axially movable focusing doublet lens spaced from said alternative objective member by an axial distance designated $S_{13}$ and spaced via said mirror means at an axial distance from said mirror designated $S_2$, said focusing lens being composed of a positive element designated II which lies in contact with a rear negative element designated III, a collective lens designated IV spaced rearwardly of said focusing lens at a distance designated $S_3$, the optical members thus far recited excepting said alternative objective cooperatively forming a first image at an axial distance $S_4$ rearwardly of lens IV, a zoom lens system which forms a virtual image of continuously variable magnification at an axial distance $S_{14}$ rearwardly of said first image, said zoom system comprising a movable positive lens member designated $Z_1$ which is located at a variable axial distance designated $S_5$ from said first image, and further comprising a movable negative lens member designated $Z_2$, said member $Z_2$ being spaced at a variable distance designated $S_6$ from member $Z_1$, said zoom lens $Z_1$ being composed of a front negative lens element having a concave rear surface in contact with a double convex lens element, and further being composed of a double convex singlet lens spaced closely adjacent to the first double convex element, said zoom lens $Z_2$ being composed of a front double concave lens element lying in contact with a rear positive meniscus element, an erector lens member located at a fixed axial distance designated $S_7$ rearwardly from said virtual image, said member comprising a doublet lens having a front negative lens element designated V and a rear positive lens element designated VI in contact therewith, and further comprising a singlet positive lens designated VII, the doublet and the singlet lenses being spaced apart by a distance which is designated $S_{16}$, the optical members thus far recited except said alternative objective cooperating to form a well-corrected third image at the eyepiece focal plane which is located at an axial distance $S_8$ rearwardly of said erector lens member, and an eyepiece member located at an axial distance designated $S_9$ from the last focal plane, said member comprising a front doublet lens having a front negative lens element designated VIII lying in contact with a rear positive lens element designated IX, and further comprising a pair of successive positive singlet lenses designated X and XI, said lens X being spaced at a distance designated $S_{10}$ from element IX, and lens XI being spaced at a distance $S_{11}$ from lens X, said optical system being characterized by constructional data which is specified by a table of numerical expressions given herebelow wherein $R_1$ to $R_{12}$ and $R_m$ represent the successive radii of optical surfaces of said optical members I to VII and said concave mirror, and the minus (—) sign which is used therewith applies to those surfaces whose centers of curvature are located on the entrant sides of their vertices, $t_1$ to $t_7$ represent the thicknesses of the successive lens parts I to VII, $S_1$ to $S_8$ and $S_{16}$ denote the spaces between and adjacent to said optical members, and $n_D$ and $\nu$ represent the refractive index and the Abbe number respectively of the optical materials in said members, the symbol F denoting the combined focal length of the corrector and mirror, $$.33F < +R_1 < .41F$$
$$.32F < +R_2 < .40F$$
$$.021F < t_1 < .027F \quad \text{Corrector Lens I}$$
$$1.500 < n_D < 1.530$$
$$60.0 < \nu < 69.0$$
$$.68F < S_1 < .84F$$
$$1.7F < -R_m < 2.2F \quad \text{(Concave Mirror)}$$
$$.80F < S_2 < .99F \quad \text{(when focused for infinity)}$$
$$.30F < +R_3 < .38F$$
$$.10F < -R_4 < .13F$$
$$.06F < +R_5 < .08F$$
$$.0068F < t_2 < .0084F$$
$$.0029F < t_3 < .0036F \quad \text{Focusing Lens}$$
$$1.615 < n_D(\text{II}) < 1.630$$
$$32.0 < \nu(\text{II}) < 40.4$$
$$1.515 < n_D(\text{III}) < 1.530$$
$$55.0 < \nu(\text{III}) < 64.0$$
$$.072F < S_3 < .088F \quad \text{(when focused for infinity)}$$
$$.148F < +R_6 < .182F$$
$$.53F < -R_7 < .67F$$
$$.0052F < t_4 < .0064F \quad \text{Collective Lens IV}$$
$$1.500 < n_D < 1.530$$
$$60.0 < \nu < 69.0$$
$$.036F < S_4 < .044F \quad \text{(lens to first image plane)}$$
$$S_5 = \begin{cases} .138F \text{ low } m \\ .102F \text{ high } m \end{cases}$$
$$S_6 = \begin{cases} .041F \text{ low } m \\ .350F \text{ high } m \end{cases} \text{ Zoom System}$$
$$.088F < F_5 < .108F$$
$$.081F < -F_6 < .098F$$
$$.40F < S_7 < .50F$$
$$1.28F < -R_8 < 1.56F$$
$$.17F < +R_9 < .21F$$
$$.16F < -R_{10} < .19F$$
$$.0058F < t_5 < .0072F$$
$$.0130F < t_6 < .0158F$$
$$1.700 < n_D(\text{V}) < 1.740$$
$$26.0 < \nu(\text{V}) < 33.0$$
$$1.500 < n_D(\text{VI}) < 1.530 \quad \text{Erector Lens}$$
$$60.0 < \nu(\text{VI}) < 69.0$$
$$.00078F < S_{16} < .00096F$$
$$.20F < +R_{11} < .26F$$
$$.39F < -R_{12} < .48F$$
$$.010F < t_7 < .013F$$
$$1.500 < n_D(\text{VII}) < 1.530$$
$$60.0 < \nu(\text{VII}) < 69.0$$
$$.046F < F_8 < .056F \quad \text{(Eyepiece focal length)}$$
$$.33F < S_8 < .41F \quad \text{(Erector to rear image plane)}$$

wherein $F_5$ and $F_6$ are the focal lengths of the front and rear zoom lens members $Z_1$ and $Z_2$, respectively, $m$ denotes magnification, and $F_8$ denotes the focal length of said eyepiece.

2. A zoom type of astronomical telescope as set forth in claim 1 and further characterized by the eyepiece being constructed according to the table of numerical expressions herebelow wherein $R_{13}$ to $R_{19}$ represent the radii of the successive lens surfaces in said eyepiece, $t_8$ to $t_{11}$ represent the axial thicknesses of the eyepiece lens elements VIII to XI, and $S_9$ represents the space between the front element of the eyepiece and the image plane on which the eyepiece is focused, and $S_{10}$, $S_{11}$ represent successive axial spaces between elements IX, X and XI of said eyepiece, $$.033 < S_9 < .041F$$
$$R_{13} > F$$
$$.039F < +R_{14} < .047F$$
$$.098F < -R_{15} < .122F$$
$$.0029F < t_8 < .0036F$$
$$.014F < t_9 < .017F$$
$$.00059F < S_{10} < .00072F$$
$$.069F < +R_{16} < .086F$$
$$.32F < -R_{17} < .40F$$
$$.0072F < t_{10} < .0088F$$
$$.00059F < S_{11} < .00072F$$
$$.042F < R_{18} < .052F \quad \text{Eyepiece}$$
$$.087F < R_{19} < .105F$$
$$.0067F < t_{11} < .0081F$$
$$1.720 < n_D(\text{VIII}) < 1.740$$
$$26.0 < \nu(\text{VIII}) < 33.0$$
$$1.600 < n_D(\text{IX}) < 1.620$$
$$53.0 < \nu(\text{IX}) < 61.0$$
$$1.575 < n_D(\text{X}) < 1.600$$
$$50.0 < \nu(\text{X}) < 57.0$$
$$1.600 < n_D(\text{XI}) < 1.620$$
$$53.0 < \nu(\text{XI}) < 61.0$$

The symbol F denoting the combined focal length of the corrector and mirror.

3. A zoom type of astronomical telescope as set forth in claim 1 further characterized by constructional data as found in the table of numerical expressions herebelow wherein $R_1$ to $R_{32}$ and $R_m$ represent the radii of the successive optical surfaces, $t_1$ to $t_{19}$ represent the axial thicknesses of the successive lens elements, $S_1$ to $S_{13}$ and $S_{16}$ designate the successive axial spaces between the optical elements, F designates the combined focal length of the corrector lens and mirror, and $n_D$ and $\nu$ represent the refractive index and Abbe number respectively of the materials used in the optical elements, the successive lens elements being designated I to XIX, $R_1 = .371F$
$R_2 = .358F$ } Corrector lens I
$-R_m = 1.95F$ Concave mirror
$R_3 = .345F$
$-R_4 = .116F$ } Focusing lens
$R_5 = .071F$
$R_6 = .165F$
$-R_7 = .599F$ } Collective lens IV
$-R_8 = 1.424F$
$R_9 = .191F$
$-R_{10} = .178F$ } Erector lens
$R_{11} = .230F$
$-R_{12} = .438F$
$R_{13} = \infty$
$R_{14} = .043F$
$-R_{15} = .110F$
$R_{16} = .0775F$ } Eyepiece
$-R_{17} = .364F$
$R_{18} = .047F$
$R_{19} = .0967F$ $R_{20} = .165F$
$-R_{21} = 1.00F$
$R_{22} = .202F$ } Finder Objective
$-R_{23} = .191F$
$R_{24} = \infty$
$-R_{25} = 177.01$
$R_{26} = 37.67$
$-R_{27} = 37.67$
$R_{28} = 53.45$ } Absolute values in millimeters, Zoom system
$-R_{29} = 65.46$
$-R_{30} = 50.58$
$R_{31} = 16.14$
$R_{32} = 27.04$ $.088F < F_2 < .108F$ (Focal length front zoom) lens
$.081F < -F_6 < .098F$ (Focal length rear zoom) lens
$t_1 = .0243F$   Corrector lens
$t_2 = .0076F$ } Focusing lens
$t_3 = .00326F$
$t_4 = .00587F$   Collective lens IV
$t_5 = .00653F$
$t_6 = .01436F$ } Erector lens
$t_7 = .01175F$
$t_8 = .00327F$
$t_9 = .0156F$
$t_{10} = .00805F$ } Eyepiece
$t_{11} = .0074F$
$t_{12} = .00609F$
$t_{13} = .00783F$ } Finder Objective
$t_{14} = .00435F$
$t_{15} = 2.5$
$t_{16} = 7.8$
$t_{17} = 4.5$ } Absolute values in millimeters, Zoom system
$t_{18} = 2.6$
$t_{19} = 3.2$
$s_1 = .76F$ (Corrector lens to concave mirror)
$s_2 = .90F$ } (Mirror to focusing lens)—when
$s_3 = .080F$ } focused for infinity
$s_4 = .0396F$ (Collective lens to first image) plane $S_5 = \begin{cases} .138F \text{ low } m \\ .102F \text{ high } m \end{cases}$ } Zoom system
$S_6 = \begin{cases} .041F \text{ low } m \\ .350F \text{ high } m \end{cases}$
$S_7 = .446F$
$S_8 = .37F$ (Erector to image plane)
$S_9 = .037F$ (Image plane to eyelens)
$S_{10} = .000653F$ } Eyepiece
$S_{11} = .000653F$
$S_{12} = .000653F$ } Finder Objective
$S_{13} = .0979F$
$S_{14} = .0664F$
$S_{16} = .00037F$ $n_D$ (I) $= n_D$(IV) $= n_D$(VI) $= n_D$(VII) $= n_D$(XII) $= n_D$(XIII)
$\nu$(I) $= \nu$ (IV) $= \nu$ (VI) $= \nu$ (VII) $= \nu$ (XII) $= \nu$ (XIII)
$n_D$ (II) $- n_D$ (III) $> .090$
$\nu$ (III) $- \nu$ (II) $> 23.0$
$n_D$ (V) $- n_D$ (VI) $> .200$
$\nu$ (VI) $- \nu$ (V) $> 32.0$
$n_D$ (VIII) $- n_D$ (IX) $> .100$
$\nu$ (IX) $- \nu$ (VIII) $> 25.0$
$n_D$ (XIV) $- n_D$ (XIII) $> .220$
$\nu$ (XIII) $- \nu$ (XIV) $> 33.0$
$n_D$ (IX) $- n_D$ (X) $> .020$
$\nu$ (IX) $> 3.0$
$n_D$ (IX) $= n_D$ (XI)
$\nu$ (IX) $= \nu$ (XI)

wherein $m$ denotes image magnification.

4. A zoom type of finder for an astronomical telescope which includes a teleobjective, said finder comprising a finder objective which includes a front singlet lens designated XII and a rear doublet having a positive lens element XIII nearest to the singlet, and in contact therewith a rear negative lens element XIV, a movable focusing lens spaced at an axial distance $S_{13}$ rearwardly of said objective and composed of a front positive lens element designated II and in contact therewith a negative lens element designated III, a collective lens designated IV spaced rearwardly of said focusing lens at an axial distance designated $S_3$, the optical members thus far recited cooperatively forming a first image at an axial distance $S_4$ rearwardly of lens IV, a zoom lens system which forms a virtual image of continuously variable magnification at an axial distance $S_{14}$ rearwardly of said first image, said system comprising a movable positive lens member designated $Z_1$ which is located at a variable axial distance $S_5$ from said first image, and further comprising a movable negative lens member designated $Z_2$, said member $Z_2$ being spaced at a variable distance designated $S_6$ from member $Z_1$, said zoom lens $Z_1$ being composed of a front negative lens element designated XV having a concave rear surface in contact with a double convex lens element designated XVI, and further composed of a double convex singlet lens designated XVII which is spaced closely to the element XVI, said zoom lens $Z_2$ being composed of a front double concave lens element designated XVIII which lies in contact with a rear positive meniscus lens element designated XIX, an erector lens member located at a fixed distance designated $S_7$ rearwardly from said virtual image, said member comprising a doublet lens having a front negative lens element designated V and a rear positive lens element designated VI in contact therewith, and further comprising a singlet positive lens designated VII, the doublet and singlet lenses being spaced apart by an axial distance $S_{16}$, the optical members thus far recited cooperating to form a well-corrected third image at the eyepiece focal plane which is located at an axial distance $S_8$ rearwardly of said erector member, and an eyepiece member located at an axial distance $S_9$ from the last-mentioned focal plane, said member comprising a front doublet lens having a front negative lens element designated VIII lying in contact with a rear positive lens element designated IX, and further comprising a pair of successive positive singlet lenses designated X and XI which are spaced from each other by a distance designated $S_{11}$ and are spaced from element IX by a distance designated $S_{10}$, the optical parts of the finder being characterized by constructional data as given in the table of mathematical statements herebelow wherein F designates the focal length of said teleobjective, $R_3$ to $R_{32}$ designate the radii of the lens surfaces, the minus (−) sign used therewith denoting surfaces which are concave toward entrant light, $t_2$ to $t_{19}$ represent the axial thicknesses of the lens elements, and $S_3$ to $S_{16}$ represent axial spaces lying between the optical elements, $.40F < +R_3 < .38F$
$.10F < -R_4 < .13F$ } Focusing lens
$.06F < +R_5 < .08F$
$.148F < +R_6 < .182F$ } Collective lens IV
$.53F < -R_7 < .67F$
$1.28F < -R_8 < 1.56F$
$.17F < +R_9 < .21F$
$.16F < -R_{10} < .19F$ } Erector lens
$.20F < +R_{11} < .26F$
$.39F < -R_{12} < .48F$
$R_{13} > F$
$.039F < +R_{14} < .047F$
$.098F < -R_{15} < .122F$
$.069F < +R_{16} < .086F$
$.32F < -R_{17} < .40F$ } Eyepiece
$.042F < +R_{18} < .052F$
$.087F < +R_{19} < .105F$ $$.14F < +R_{20} < .19F$$
$$.90F < -R_{21} < 1.10F$$
$$.18F < +R_{22} < .23F$$
$$.17F < -R_{23} < .21F$$
$$R_{24} > F$$
} Finder objective $$.372F < -R_{25} < .397F$$
$$.0714F < R_{26} < .089F$$
$$.0714F < -R_{27} < .089F$$
$$.0979F < R_{28} < .1253F$$
$$.1270F < -R_{29} < .1536F$$
$$.0979F < -R_{30} < .1172F$$
$$.0315F < R_{31} < .0382F$$
$$.0558F < R_{32} < .0655F$$
} Zoom System $$.0068F < t_2 < .0084F$$
$$.0029F < t_3 < .0036F$$
} Focusing lens $$.0052F < t_4 < .0064F$$ Collective lens IV $$.0058F < t_5 < .0072F$$
$$.0130F < t_6 < .0158F$$
$$.010F < t_7 < .013F$$
} Erector lens $$.0029F < t_8 < .0036F$$
$$.014F < t_9 < .017F$$
$$.0072F < t_{10} < .0088F$$
$$.0067F < t_{11} < .0081F$$
} Eyepiece $$.0054F < t_{12} < .0068F$$
$$.0070F < t_{13} < .0086F$$
$$.0039F < t_{14} < .0048F$$
} Finder objective $$.00489F < t_{15} < .00596F$$
$$.01514F < t_{16} < .01860F$$
$$.00871F < t_{17} < .01077F$$
$$.0050F < t_{18} < .00656F$$
$$.00636F < t_{19} < .00764F$$
} Zoom system $.072F < S_3 < .088F$ When focused for infinity
$.036F < S_4 < .044F$ Collective lens to first image plane $$S_5 = \begin{cases} .138F \text{ low } m \\ .102F \text{ high } m \end{cases} \text{Zoom System}$$

$$S_6 = \begin{cases} .041F \text{ low } m \\ .350F \text{ high } m \end{cases}$$

$.40F < S_7 < .50F$
$.33F < S_8 < .41F$ Erector to rear image plane
$.033F < S_9 < .041F$ Image plane to eyelens
$.00059F < S_{10} < .00072F$
$.00059F < S_{11} < .00072F$ } Eyepiece
$.00059F < S_{12} < .00072F$ Finder objective
$.088F < S_{13} < .108F$
$.00078F < S_{16} < .00096F$ wherein $m$ denotes magnification of the image.

References Cited in the file of this patent

UNITED STATES PATENTS

| | | |
|---|---|---|
| 2,409,186 | Bouwers | Oct. 15, 1946 |
| 2,638,814 | Kueffel et al. | May 19, 1953 |
| 2,753,760 | Braymer | July 10, 1956 |
| 2,844,996 | Klemt | July 29, 1958 |
| 3,028,791 | Clark et al. | Apr. 10, 1962 |

FOREIGN PATENTS

| | | |
|---|---|---|
| 894,527 | France | Mar. 13, 1944 |
| 852,302 | Great Britain | Oct. 26, 1960 |

UNITED STATES PATENT OFFICE
CERTIFICATE OF CORRECTION

Patent No. 3,152,214                                        October 6, 1964

Herbert D. Korones et al.

It is hereby certified that error appears in the above numbered patent requiring correction and that the said Letters Patent should read as corrected below.

Column 3, line 22, for "on" read -- an --; column 5, second table, line 19 thereof, for "$039F<R+_{14}<.047F$" read -- $.039F<+R_{14}<.047F$ --; same table line 39 thereof, for "$14F<+R_{20}<.19F$" read -- $.14F<+R_{20}<.19F$ --; column 9, in the table, line 38 thereof, for "Fodusing lens" read -- Focusing lens --; column 10, in the table, line 1 thereof, for ".$40F<+R_3<.38F$" read -- $.30F<+R_3<.38F$ --.

Signed and sealed this 9th day of February 1965.

(SEAL)
Attest:

ERNEST W. SWIDER                                    EDWARD J. BRENNER
Attesting Officer                                 Commissioner of Patents